United States Patent
Hsieh

(10) Patent No.: US 6,666,633 B2
(45) Date of Patent: Dec. 23, 2003

(54) POSITIONING ASSEMBLY FOR POSITIONING A CONTAINER ON A PLATFORM

(76) Inventor: David Hsieh, 3F, No. 2, Chin-Chung St., Taichung (TW)

( * ) Notice: Subject to any disclaimer, the term of this patent is extended or adjusted under 35 U.S.C. 154(b) by 0 days.

(21) Appl. No.: 10/145,433

(22) Filed: May 14, 2002

(65) Prior Publication Data

US 2003/0215299 A1 Nov. 20, 2003

(51) Int. Cl.[7] .................................................. B60P 7/08
(52) U.S. Cl. ........................... 410/85; 410/68; 410/77; 410/96; 410/100
(58) Field of Search ............................ 410/68, 77, 85, 410/80, 96, 97, 100, 81, 84; 248/499; 114/75

(56) References Cited

U.S. PATENT DOCUMENTS

| | | | | |
|---|---|---|---|---|
| 1,974,686 A | * | 9/1934 | Meyercord | 410/84 |
| 3,083,670 A | * | 4/1963 | Harlander et al. | 410/85 |
| 3,398,922 A | * | 8/1968 | Martin | 410/85 |
| 3,647,172 A | * | 3/1972 | Van Der Molen | 410/85 |
| 3,709,455 A | * | 1/1973 | Last | 410/85 |
| 3,722,714 A | * | 3/1973 | Morris et al. | 410/85 |
| 3,776,169 A | * | 12/1973 | Strecker | 410/77 |
| 4,249,840 A | * | 2/1981 | Kallaes et al. | 410/81 |
| 4,497,271 A | * | 2/1985 | Gloystein | |
| 4,537,539 A | * | 8/1985 | Borchardt | 410/77 |
| 4,732,516 A | * | 3/1988 | Borchardt | 410/77 |
| 4,861,205 A | * | 8/1989 | Wozniak et al. | 410/47 |

* cited by examiner

*Primary Examiner*—Stephen T. Gordon
(74) *Attorney, Agent, or Firm*—Christie, Parker & Hale, LLP

(57) ABSTRACT

A positioning assembly includes a first connecting rod with a threaded end section, a second connecting rod with a threaded end section, an adjusting member having two opposite threaded ends that threadedly engage the threaded end sections of the first and second connecting rods and an intermediate section extending between the threaded ends, and a restricting member mounted on one of the first and second connecting rods and releasably engageable with the intermediate section when said one of the first and second connecting rods rotates relative to the adjusting member in a loosening direction, thereby preventing further rotation of said one of the first and second connecting rods relative to the adjusting member.

3 Claims, 6 Drawing Sheets

POSITIONING ASSEMBLY FOR POSITIONING A CONTAINER ON A PLATFORM

BACKGROUND OF THE INVENTION

1. Field of The Invention

This invention relates to a positioning assembly for positioning a container on a platform of a vehicle.

2. Description of the Related Art

FIGS. 1 and 2 illustrate conventional positioning assemblies 3 for positioning containers 1 on a platform 2 of a vehicle, such as a cargo-carrying ship. Each of the positioning assemblies 3 includes first and second connecting rods 31, 32, an adjusting member 33 an extension rod 34, and a hook member 321. The second connecting rod 32 is connected to a corner fitting 11 of a respective one of the containers 1 via the hook member 321 and the extension rod 34, and has a threaded end section 322 that threadedly engages a threaded end 331 of the adjusting member 33. The first connecting rod 31 has one end 311 connected to a fitting of the platform 2, and a threaded end section 312 that is opposite to the end 311 and that threadedly engages another threaded end 332 of the adjusting member 33 So as to permit tightening and loosening of the positioning assembly 3 on the respective container 1 and the platform 2 and so as to position the containers 1 on the platform 2. However, the conventional positioning assembly 3 tends to loosen as a result of relative rotation between the adjusting member 33 and the first and second connecting rods 31, 32 due to undesired movement of the containers 1 on the platform 2 caused by repeatedly swaying of the ship on the sea surface.

SUMMARY OF THE INVENTION

Therefore, the object of the present invention is to provide a positioning assembly that is capable of overcoming the aforesaid drawback.

According to the present invention, there is provided a positioning assembly for positioning a container on a platform. The container has a corner fitting. The positioning assembly comprises: a first connecting rod having a container-connecting end that is adapted to be connected to the corner fitting of the container, and a threaded end section that is opposite to the container-connecting end; a second connecting rod having a platform-connecting end that is adapted to be connected to the platform, and a threaded end section that is opposite to the platform-connecting end; an elongated adjusting member with two opposite threaded ends that threadedly engage the threaded end sections of the first and second connecting rods, respectively, so as to permit tightening and loosening of the positioning assembly on the container and the platform, the adjusting member further having an elongated intermediate section extending between the threaded end s of the adjusting member; and a restricting member mounted on one of the first and second cnnecting rods and releasably engageable with the intermediate section when the one of the first and second connecting rods rotates relative to the adjusting member in a loosening direct on due to undesired movement of the container on the platform, thereby preventing further rotation of the one of the first and second connecting rods relative to the adjusting member.

BRIEF DESCRIPTION OF THE DRAWINGS

In drawings which illustrate an embodiment of the invention.

DETAILED DESCRIPTION OF THE PREFERRED EMBODIMENT

Figure 1:
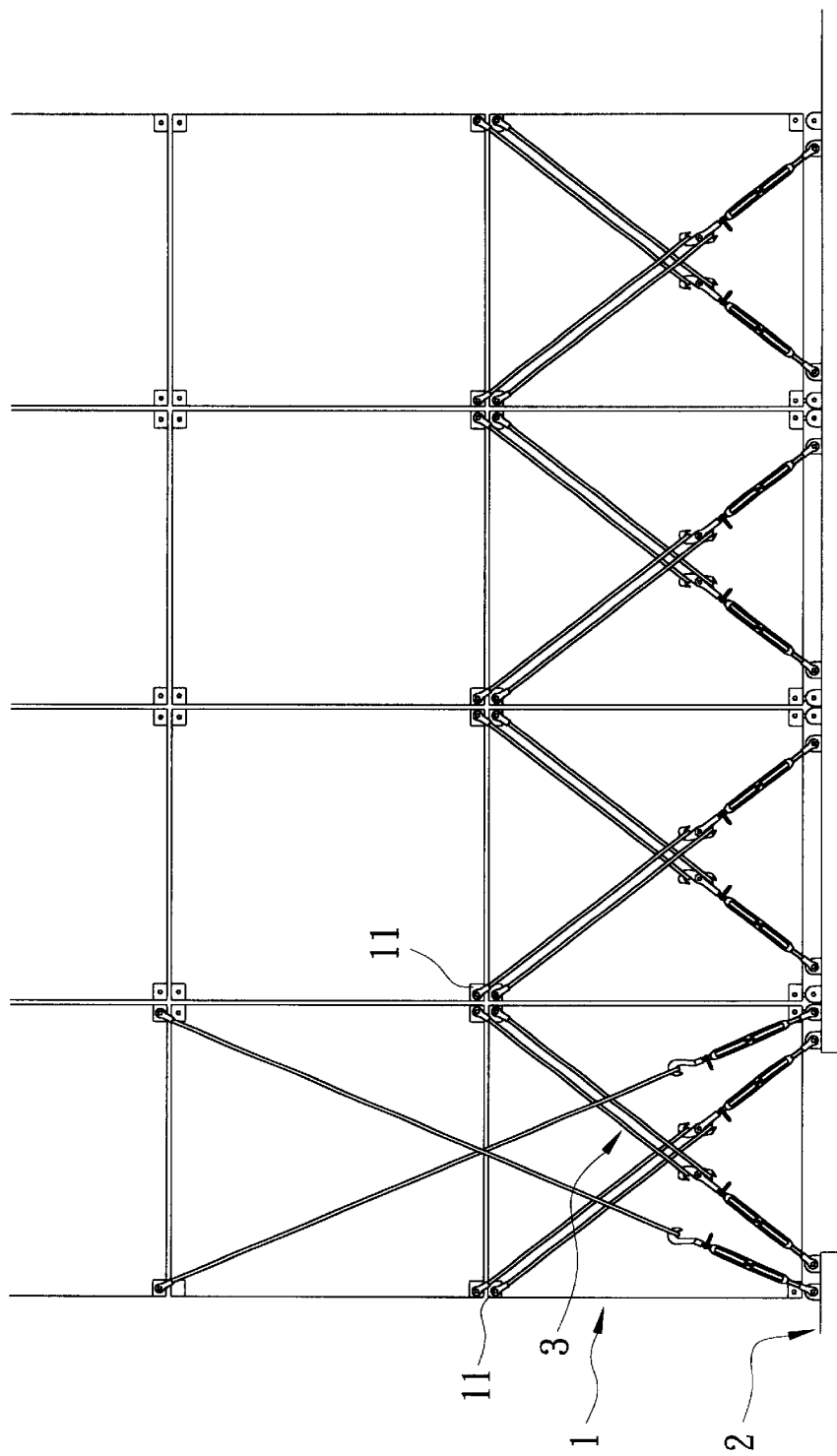
FIG. 1 is a schematic side view to illustrate how conventional positioning assemblies are connected to corner fittings of containers on a platform.
Figure 2:
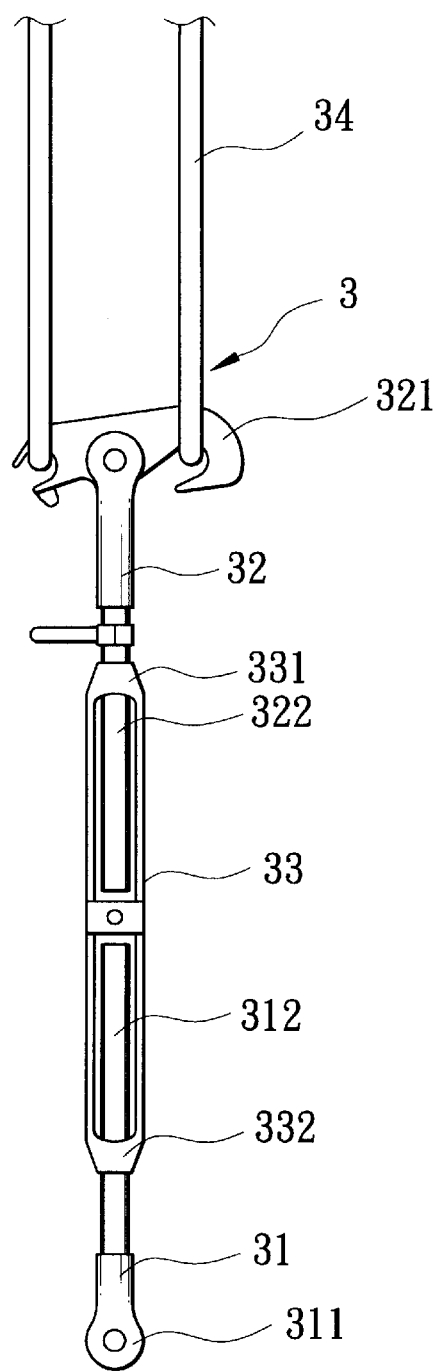
FIG. 2 is a fragmentary schematic side view of one of the positioning assemblies of FIG. 1.
Figure 3:
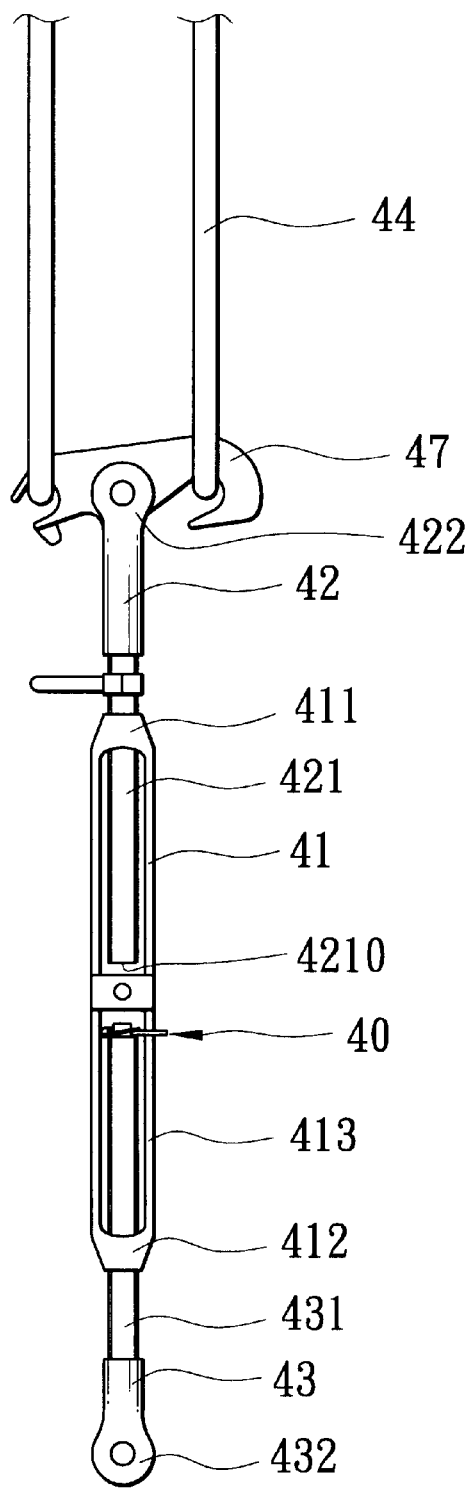
FIG. 3 is a fragmentary schematic side view of a preferred embodiment of a positioning assembly of this invention.
Figure 4:
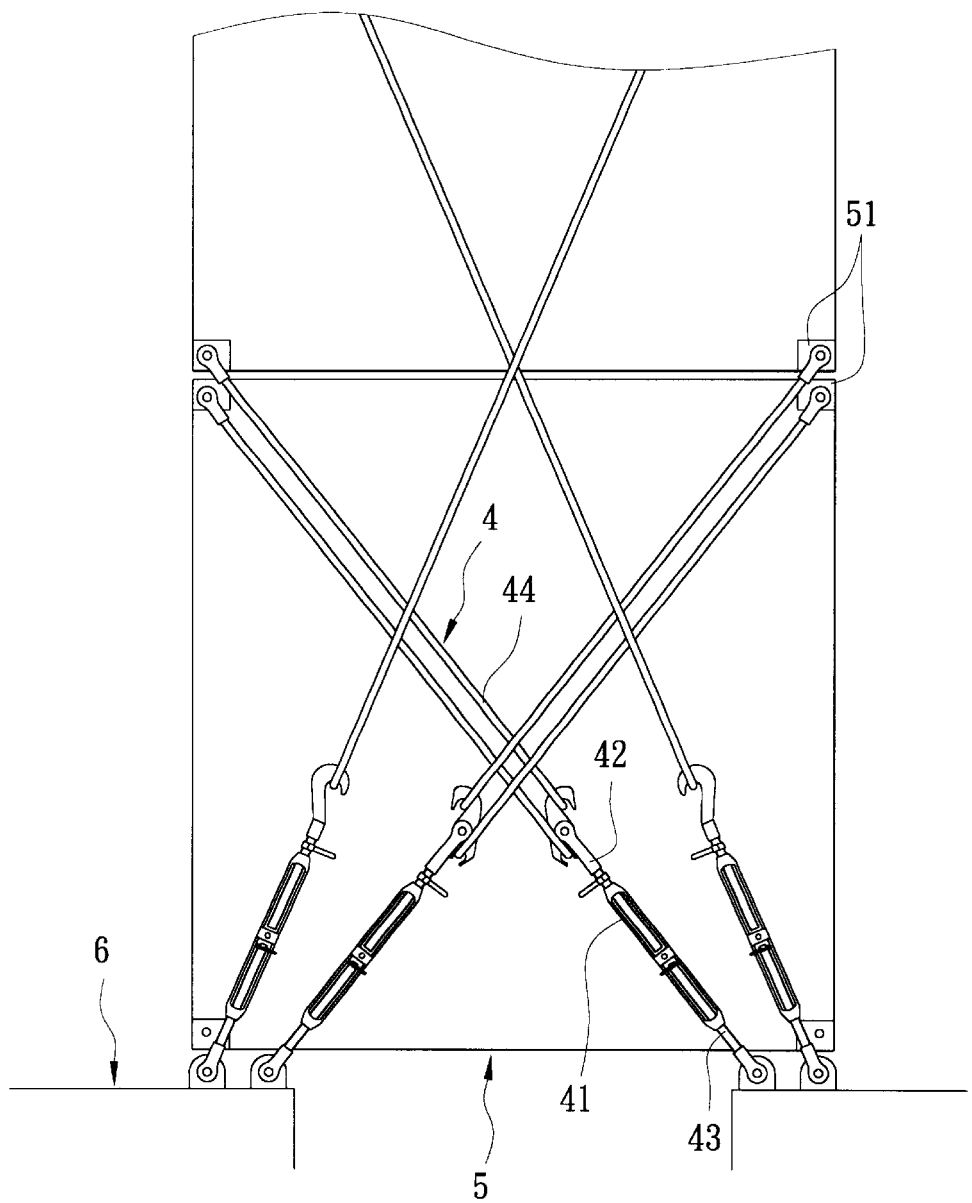
FIG. 4 is a schematic side view to illustrate how the positioning assembly of FIG. 3 is connected to a container on a platform.
Figure 5:
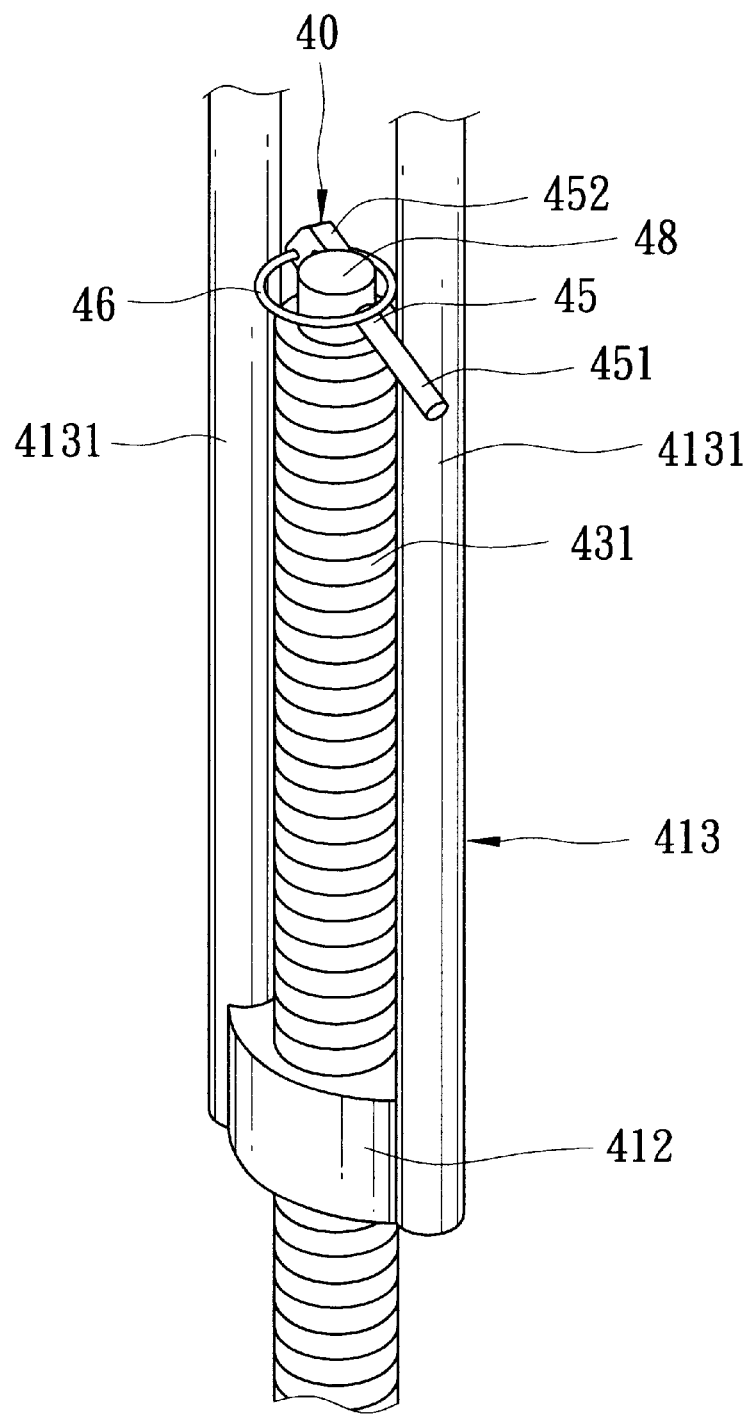
FIG. 5 is a fragmentary perspective view to illustrate how a restricting member functions to prevent relative rotation between a connecting rod and an adjusting member of the positioning assembly of FIG. 3.
Figure 6:
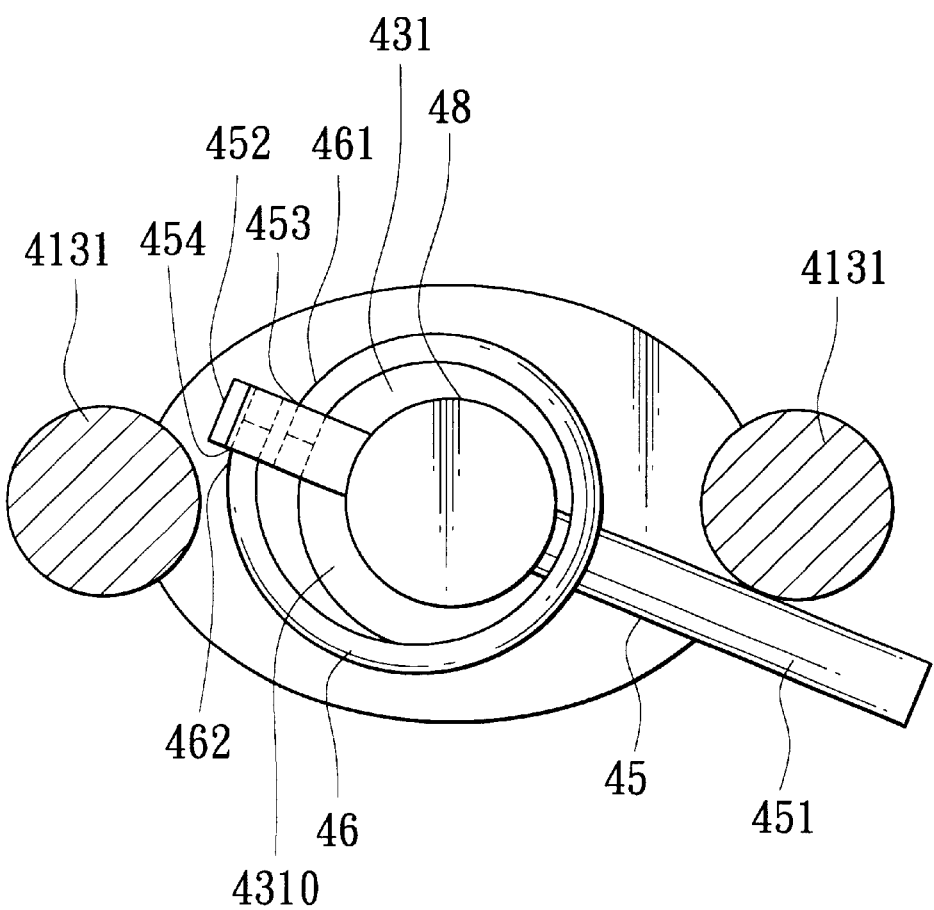
FIG. 6 is a top sectional view to illustrate how a rigid curved strip functions to lock a pin to a stud of the restricting member of FIG. 5.

FIGS. 3 to 6 illustrate the preferred embodiment of the positioning assembly 4 of this invention for positioning a container 5 on a platform 6 of a vehicle, such as a cargo-carrying ship (not shown). The container 5 has a corner fitting 51.

The positioning assembly 4 includes: a first connecting rod 42 having a container-connecting end 422 that is adapted to be connected to the corner fitting 51 of the container, 5 in a conventional manner via a hook member 47 and an extension rod 44, and a threaded end section 421 that is opposite to the container-connecting end 422 and that has an end face 4210; a second connecting rod 43 having a platform-connecting end 432 that is adapted to be connected to the platform 6, and a threaded end section 431 that is opposite to the platform-connecting end 432 and that has an end face 4310 (see FIG. 6); an elongated adjusting member 41 with two opposite threaded ends 411, 412 that threadedly engage the threaded end sections 421, 431 of the first and second connecting rods 42, 43, respectively, so as to permit tightening and loosening of the positioning assembly 4 on the container 5 and the platform 6, the adjusting member 41 further having an elongated intermediate section 413 extending between the threaded ends 411, 412 of the adjusting member 41; and a restricting member 40 including a stud 48 that projects outwardly and coaxially from the end face 4310 of the threaded end section 431 of the second connecting rod 43 and that has a cross-section less than the diameter of the end face 4310 of the threaded end section 431 of the second connecting rod 43, and an engaging piece 45 that is detachably mounted on the stud 48, that projects therefrom toward the intermediate section 413, and that is releasably engageable with the intermediate section 413 when the second connecting rod 43 rotates relative to the adjusting member 41 in a loosening direction due to undesired movement of the container 5 on the platform 6, thereby preventing further rotation of the second connecting rod 43 relative to the adjusting member 41. Similarly, another restricting member (not shown) can be provided on the threaded end section 421 of the first connecting rod 42 for preventing rotation of the first connecting rod 42 relative to the adjusting member 41.

The intermediate section 413 has two diametrically disposed rod pieces 4131 that interconnect the threaded ends 411, 412 of the adjusting member 41. The threaded end sections 421, 431 of the first and second connecting rods 42, 43 respectively extend through the threaded ends 411, 412 of the adjusting member 41 toward each other, and are disposed between the rod pieces 4131. The engaging piece 45 is in the form of a pin that extends through the stud 48 in a transverse direction relative to a length of the intermediate section 413 and that has a tail 451 abutting against one of the rod pieces 4131 when the second connecting rod 43 rotates in the loosening direction.

The pin further has a head 452 that is opposite to the tail 451. The head 452 and the tail 451 of the pin are disposed at two opposite sides of the stud 48. The head,452 of the pin is formed with two opposing retaining holes 453, 454. The restricting member 40 further includes a locking member 46 in the form of a rigid curved strip that has two opposite ends 461, 462 rotatably retained in the retaining holes 453, 454 so as to be rotatable between a locking position, in which, the curved strip 46 surrounds the stud 48 and is releasably engagable with the stud 48 when the pin moves away from said one of the rod pieces 4131 in the transverse direction, thereby preventing removal of the pin from the stud 48, and an unlocking position, in which, the curved strip 46 does not surround the stud 48, thereby permitting removal of the pin from the stud 48.

With the inclusion of the restricting member 40 in the positioning assembly 4 of this invention, the drawbacks as encountered in the prior art can be eliminated.

With the invention thus explained, it is apparent that various modifications and variations can be made without departing from the spirit of the present invention. It is therefore intended that the invention be limited only as recited in the appended claims.

I claim:

1. A positioning assembly for positioning a container on a platform, the container having a corner fitting, said positioning assembly comprising:

a first connecting rod having a container-connecting end that is adapted to be connected to the corner fitting of the a container, and a threaded end section that is opposite to said container-connecting end;

a second connecting rod having a platform-connecting end that is adapted to be connected to the platform, and a threaded end section that is opposite to said platform-connecting end;

an elongated adjusting member with two opposite threaded ends that threadedly engage said threaded end sections of said first and second connecting rods, respectively, so as to permit tightening and loosening of said positioning assembly on the container and the platform, said adjusting member further having an elongated intermediate section extending between said threaded ends of said adjusting member; and a restricting member mounted on one of said first and second connecting rods and releasably engageable with said intermediate section when said one of said first and second connecting rods rotates relative to said adjusting member in a loosening direction due to undesired movement of the container on the platform, thereby preventing further rotation of said one of said first and second connection rods relative to said adjusting member wherein each of said threaded end sections of said first and second connecting rods has an end face, said restricting member including a stud that projects outwardly and coaxially from said end face of said threaded end section of said one of said first and second connecting rods and that has a cross-section less than the diameter of said end face of said threaded end section of said one of said first and second connecting rods, and an engaging piece that is detachably mounted on said stud, that projects therefrom toward said intermediate section, and that is realeasably engageable with said intermediate section when said one of said first and second connecting rods rotates relative to said adjusting member in the loosening direction.

2. The positioning assembly of claim 1, wherein said intermediate section has two diametrically disposed rod pieces that interconnect said threaded ends of said adjusting member, said threaded end sections of said first and second connecting rods respectively extending through said threaded ends of said adjusting member toward each other and being disposed between said rod pieces, said engaging piece being in the form of a pin that extends through said stud in a transverse direction relative to a length of said intermediate section and that has a tail abutting against one of said rod pieces when said one of said first and second connecting rods rotates in the loosening direction.

3. The positioning assembly of claim 2, wherein said pin further has a head that is opposite to said tail, said head and said tail of said pin being disposed, at two opposite sides of said stud, said head of said pin being formed with two opposing retaining holes, said restricting member further including a locking member in the form of a rigid curved strip that has two opposite ends rotatably retained in said retaining holes so as to be rotatable between a locking position, in which, said curved strip surrounds said stud and is releasably engagable with said stud when said pin moves away from said one of said rod pieces in the transverse direction, thereby preventing removal of said pin from said stud, and an unlocking position, in which, said curved strip does not surround said stud, thereby permitting removal of said pin from said stud.

\* \* \* \* \*

UNITED STATES PATENT AND TRADEMARK OFFICE
CERTIFICATE OF CORRECTION

PATENT NO. : 6,666,633 B2
DATED : December 23, 2003
INVENTOR(S) : David Hsieh

It is certified that error appears in the above-identified patent and that said Letters Patent is hereby corrected as shown below:

Column 3,
Line 36, delete "a" (first occurrence)

Column 4,
Line 8, change "connection" to -- connecting --
Line 19, change "realeasably" to -- releasably --

Signed and Sealed this

Fifth Day of April, 2005

JON W. DUDAS
*Director of the United States Patent and Trademark Office*